(12) United States Patent
Hongo

(10) Patent No.: US 7,649,736 B2
(45) Date of Patent: Jan. 19, 2010

(54) ELECTRONIC DEVICE

(75) Inventor: Takeshi Hongo, Sagamihara (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/338,370

(22) Filed: Dec. 18, 2008

(65) Prior Publication Data

US 2009/0103265 A1  Apr. 23, 2009

Related U.S. Application Data

(63) Continuation of application No. 11/797,158, filed on May 1, 2007, now abandoned.

(30) Foreign Application Priority Data

May 31, 2006  (JP) ............................. 2006-152286

(51) Int. Cl.
H05K 7/20 (2006.01)
(52) U.S. Cl. ............................ 361/679.47; 361/679.48; 361/679.52; 361/688; 361/696; 361/695; 165/80.5; 165/104.21; 165/104.26; 165/104.33
(58) Field of Classification Search ................ 361/679.46–679.49, 687, 690–697, 702–714, 361/717–728; 165/80.2–80.5, 104.29, 104.33, 165/104.21–104.27, 121, 126, 185; 454/184; 257/717–727; 312/223.2, 223.3
See application file for complete search history.

(56) References Cited

U.S. PATENT DOCUMENTS

| | | | |
|---|---|---|---|
| 4,949,218 A * | 8/1990 | Blanchard et al. ........... | 361/696 |
| 6,043,977 A | 3/2000 | Nakajima | |
| 6,049,455 A * | 4/2000 | Nakamura et al. .......... | 361/688 |
| 6,621,698 B2 | 9/2003 | Chang | |
| 6,789,611 B1 * | 9/2004 | Li .......................... | 165/104.29 |
| 6,804,115 B2 | 10/2004 | Lai | |
| 6,822,856 B2 | 11/2004 | Fujiwara | |
| 6,927,978 B2 | 8/2005 | Arai et al. | |
| 7,079,394 B2 | 7/2006 | Mok | |
| 7,120,015 B2 | 10/2006 | Furuya | |
| 7,273,089 B2 | 9/2007 | Hata et al. | |
| 7,405,930 B2 * | 7/2008 | Hongo et al. .......... | 361/679.48 |
| 2002/0053421 A1 | 5/2002 | Hisano et al. | |
| 2005/0231912 A1 | 10/2005 | Arai | |
| 2005/0276018 A1 * | 12/2005 | Moore et al. ................ | 361/695 |
| 2006/0232934 A1 | 10/2006 | Kusamoto et al. | |

FOREIGN PATENT DOCUMENTS

| | | |
|---|---|---|
| JP | 2004-119844 | 4/2004 |
| JP | 2005-189453 | 7/2005 |

* cited by examiner

*Primary Examiner*—Michael V Datskovskiy
(74) *Attorney, Agent, or Firm*—Pillsbury Winthrop Shaw Pittman, LLP

(57) ABSTRACT

According to one embodiment, an electronic device includes a housing including an opening, a partition wall which partitions an interior part of the housing into a first chamber and a second chamber which is opened to the outside through the opening, first and second heat generating parts mounted in the first chamber, a first heat radiation member located in the second chamber, a heat transfer member which transfers heat generated by the first heat generating part, a cooling fan which draws outside air and exhausts the air against the first heat radiation member, a second heat radiation member which is exposed to the outside of the housing and is thermally connected to the second heat generating part, and a cover covering the opening and the second heat radiation member. The cover forms a gap between the cover and the housing. The gap communicates with the second chamber.

17 Claims, 16 Drawing Sheets

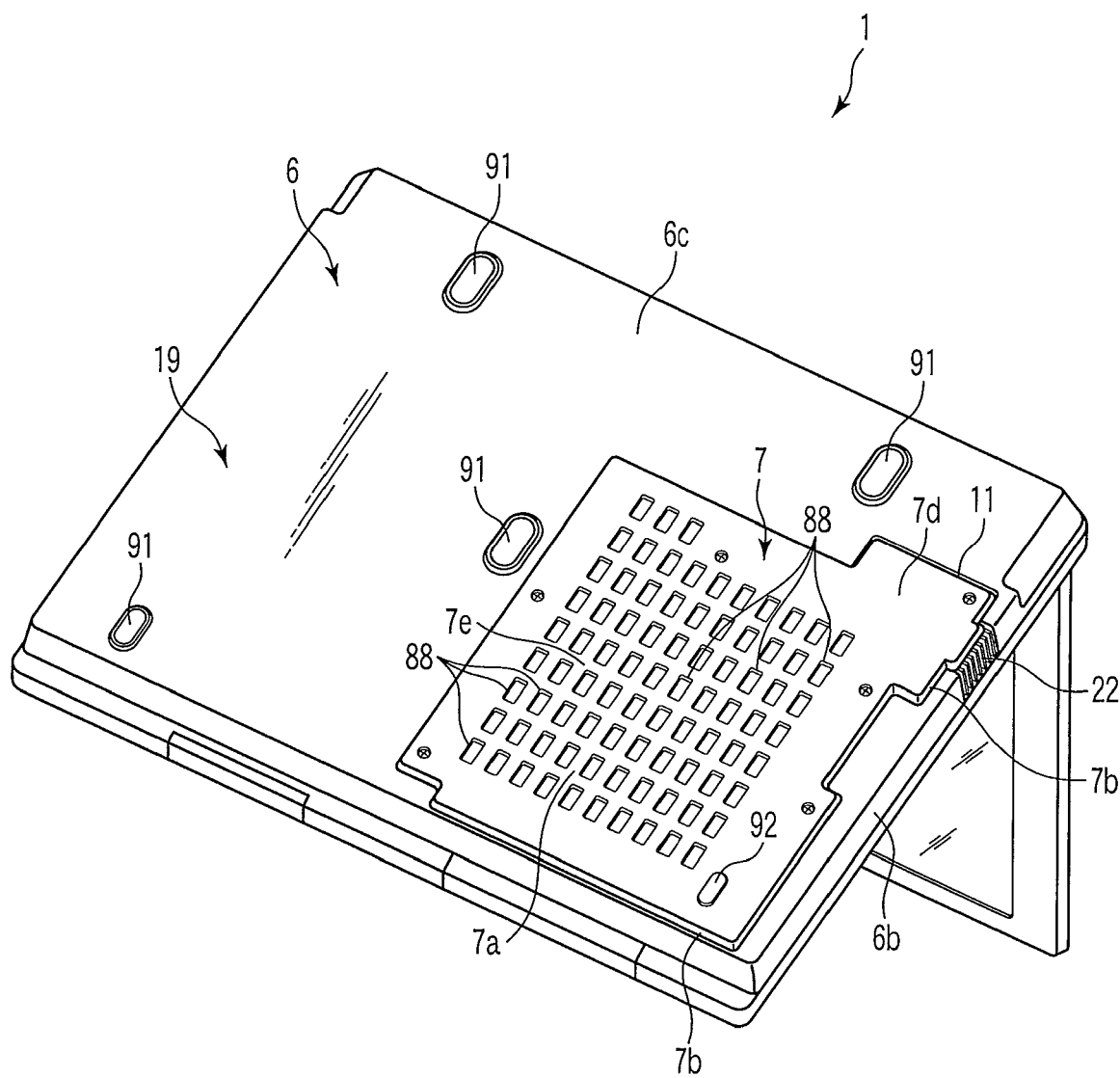
F I G. 3

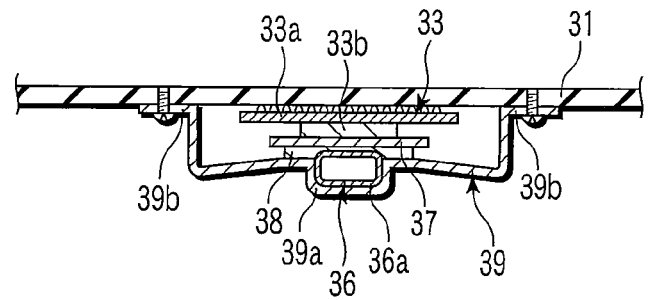
F I G. 7
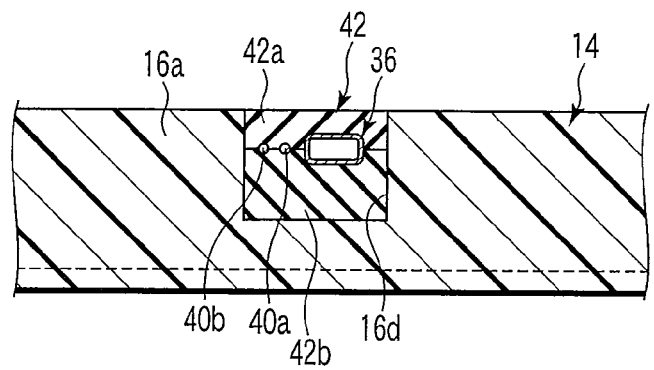
F I G. 8
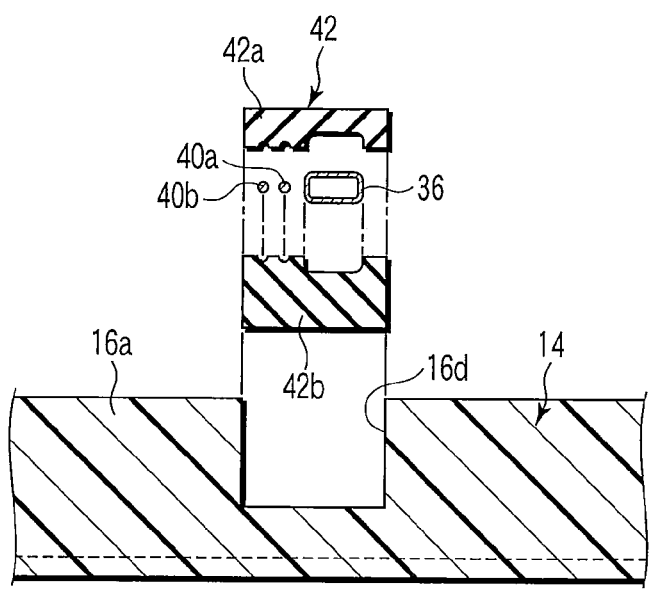
F I G. 9

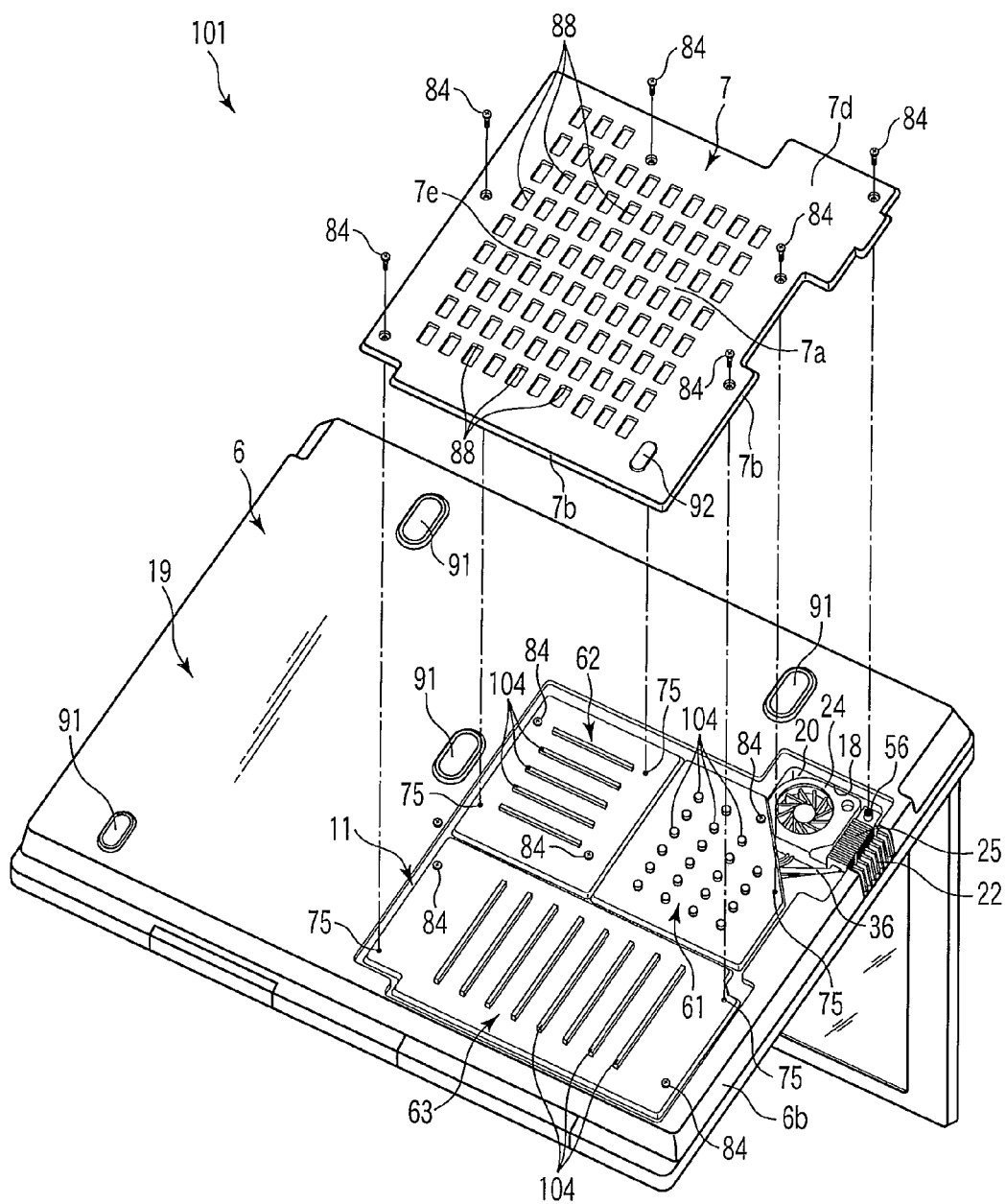
F I G. 21

ELECTRONIC DEVICE

CROSS-REFERENCE TO RELATED APPLICATIONS

This application is a continuation of co-pending U.S. application Ser. No. 11/797,158, filed May 1, 2007, and for which priority is claimed under 35 U.S.C. §120. This application is based upon and claims the benefit of priority under 35 U.S.C. § 119 from the prior Japanese Patent Application No. 2006-152286, filed May 31, 2006, the entire contents of both applications are incorporated herein by reference in their entireties.

BACKGROUND

1. Field

One embodiment of the invention relates to an electronic device, for example, including heat generating parts mounted thereon.

2. Description of the Related Art

An electronic device such as, for example, a portable computer contains heat generating parts mounted within a housing thereof. Recently, heat generating parts, for example, a CPU, exhibit a tendency wherein the amount of heat generated is increasing. The same is also true for circuit parts such as memory chips and north bridge circuits. Under these circumstances, there is a strong demand of further enhancement of cooling efficiency in electronic devices.

A display device provided with heat radiation parts is disclosed in Jpn. Pat. Appln. KOKAI Publication No. 2005-189453. In the display device, a heat radiation member is provided on the rear side of a case thereof, while being exposed to outside. The heat radiation member is thermally connected to a liquid crystal display unit within the case.

An electronic device provided with a waterproof and cooling structure is disclosed in Jpn. Pat. Appln. KOKAI Publication No. 2004-119844. The electronic device includes a metal housing having a heating component mounted therein, and a cover entirely covering the metal housing. The cover has an intake port and an exhaust port. An air passage whereby the intake port communicates with the exhaust port is formed between the cover and the metal housing. A fan is provided at the exhaust port of the housing.

The heat radiating member of the display device functions as a heat sink exposed to the outside of the housing to thereby cool the liquid crystal display unit. In other words, the heat radiating member exhausts the heat generated by the liquid crystal display unit to the outside of the housing by natural heat radiation. This leaves room for improvement from the standpoint of cooling efficiency.

In the cooling structure of the electronic device, the heat from the heating component is radiated through the metal housing. Even when a plurality of heating components having different heating amounts are installed in the housing of the electronic device, the heat from all the heating components is radiated through the metal housing. This leaves room for improvement from the standpoint of cooling efficiency.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIG. 3 is an exemplary perspective view showing the portable computer of the first embodiment;

FIG. 7 is an exemplary cross-sectional view showing the periphery of a CPU taken along line F7-F7 in FIG. 6;

FIG. 8 is an exemplary cross-sectional view showing a partition wall taken along line F8-F8 in FIG. 6;

FIG. 9 is an exemplary cross-sectional view showing a sealing member shown in FIG. 8 when it is exploded;

FIG. 21 is an exemplary perspective view showing the portable computer according to the second embodiment.

DETAILED DESCRIPTION

Various embodiments according to the invention will be described hereinafter with reference to the accompanying drawings. In general, according to one embodiment of the invention, an electronic device includes: a housing including an opening and an exhaust hole; a partition wall which partitions an interior part of the housing into a first chamber and a second chamber which communicates with the exhaust hole and is opened to the outside of the housing through the opening; first and second heat generating parts mounted in the first chamber; a first heat radiation member located in the second chamber; a heat transfer member which transfers heat generated by the first heat generating part to the first heat radiation member; a cooling fan which is located in the second chamber and draws outside air through the opening and exhausts the outside air against the first heat radiation member; a second heat radiation member which is exposed to the outside of the housing and is thermally connected to the second heat generating part; and a cover mounted on the housing, the cover covering the opening and the second heat radiation member. The cover forms a gap between the cover and the housing. The gap communicates with the second chamber through the opening and allows outside air to flow therethrough.

Embodiments of the present invention will be described with reference to the accompanying drawings. In the embodiments, the invention is applied to a portable computer.

Figure 1:
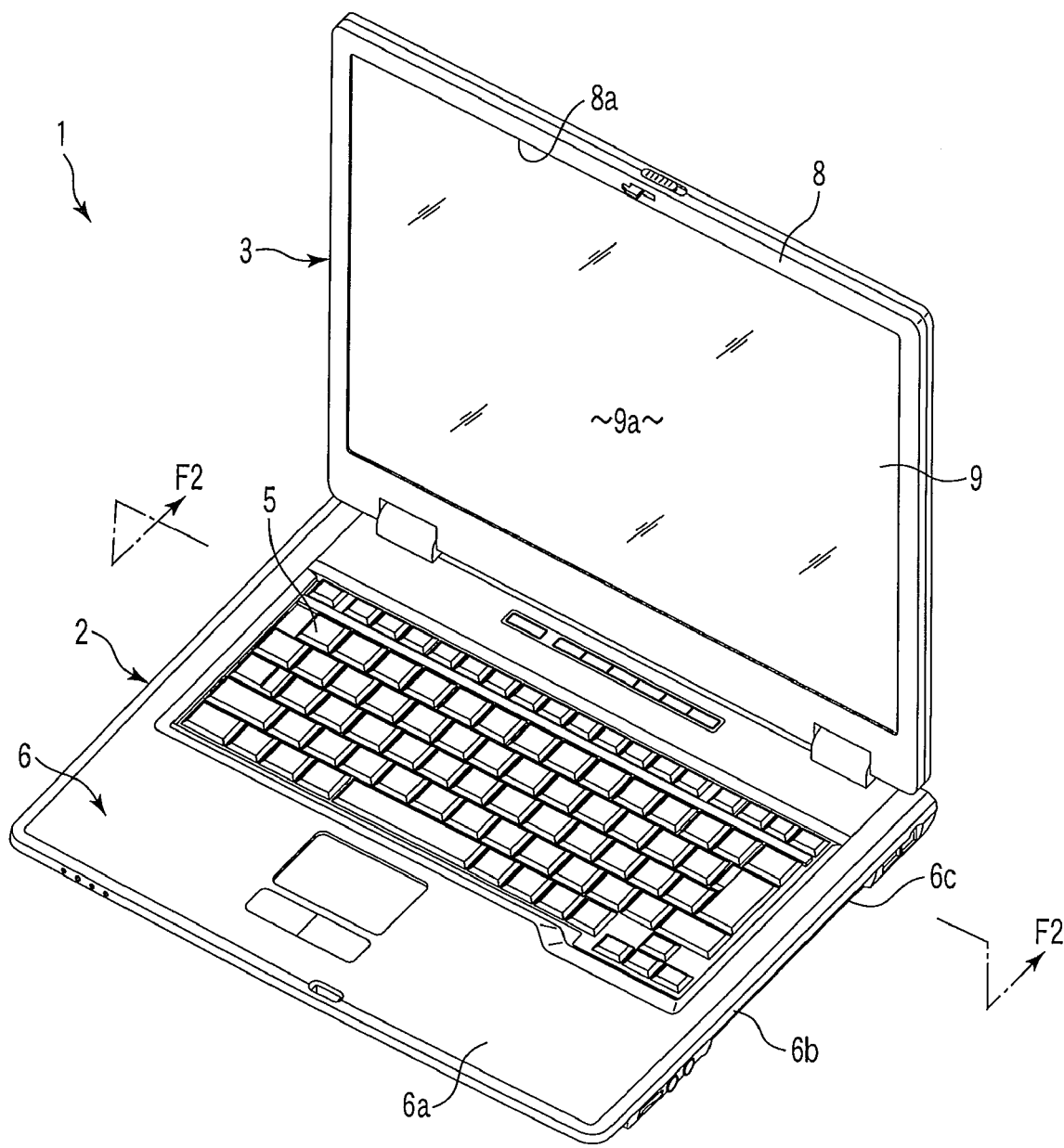
FIG. 1 is an exemplary perspective view showing a portable computer according to a first embodiment of the invention.

FIGS. 1 to 19 show a portable computer 1, which is an electronic device according to a first embodiment of the present invention. As shown in FIG. 1, the portable computer 1 has a main body 2 and a display unit 3.

Figure 2:
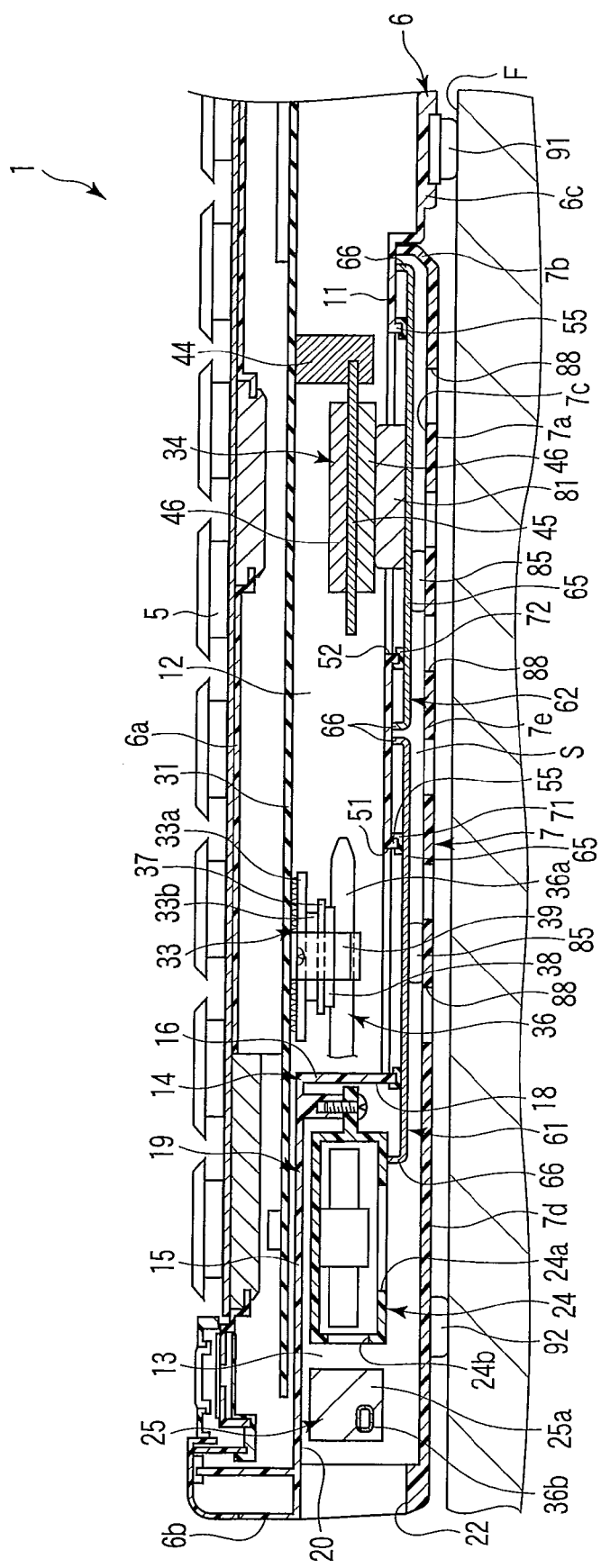
FIG. 2 is an exemplary cross-sectional view showing the portable computer taken along line F2-F2 in FIG. 1.

As shown FIGS. 2 and 3, the main body 2 includes a box-like housing 6, and a cover 7 attached to the lower surface of the housing 6. The housing 6 has an upper wall 6a, a sidewall 6b and a lower wall 6c. By way of example, the upper wall 6a, the sidewall 6b and the lower wall 6c form an outer wall of the housing 6. A keyboard 5 is supported on the upper wall 6a.

The display unit 3 includes a display housing 8 and a liquid crystal display panel 9 housed in the display housing 8. The Liquid crystal display panel 9 is provided with a display screen 9a. The display screen 9a is exposed to the outside through an opening 8a which is formed in the front side of the display housing 8.

The display unit 3 is supported on the rear end of the housing 6 by means of a hinge device (not shown).

The display unit 3 may be hinged between a closed position and an open position. When the display unit 3 is hinged toward the closed position and reaches the closed position, it covers the upper side of the upper wall 6a at the closed position. When the display unit 3 is hinged upward from the closed position, the upper wall 6a is exposed to outside.

Figure 4:
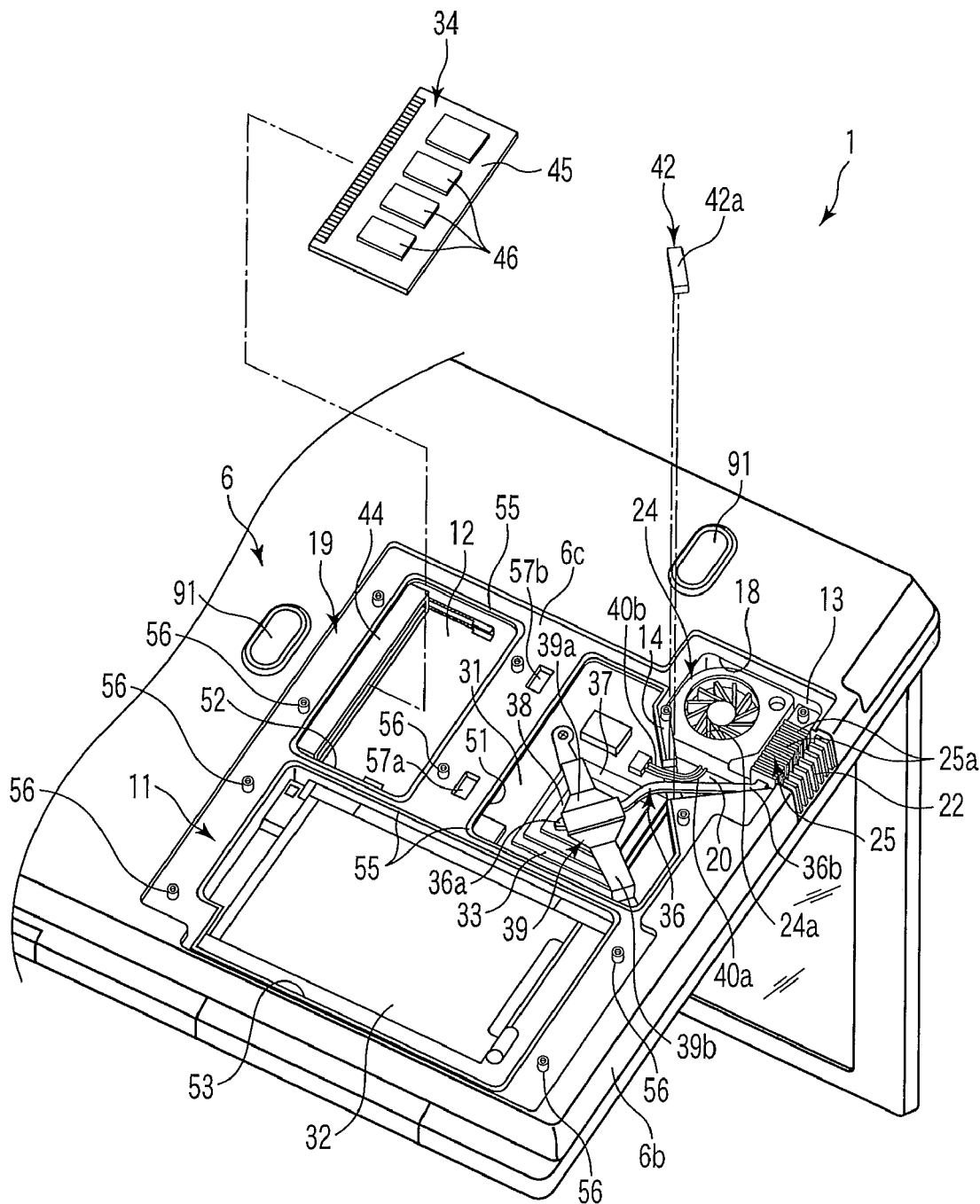
FIG. 4 is an exemplary perspective view showing an interior part of the portable computer of the first embodiment.

As shown in FIG. 4, a cover mounting portion 11 to which the cover 7 is mounted is formed on the lower wall 6c of the housing 6. A configuration of the cover mounting portion 11 is substantially the same as the external configuration of the cover 7. The cover mounting portion 11 is depressed toward the inner side of the housing 6 by a thickness of the cover 7 from the lower wall 6c located out of the cover mounting portion 11.

Figure 5:
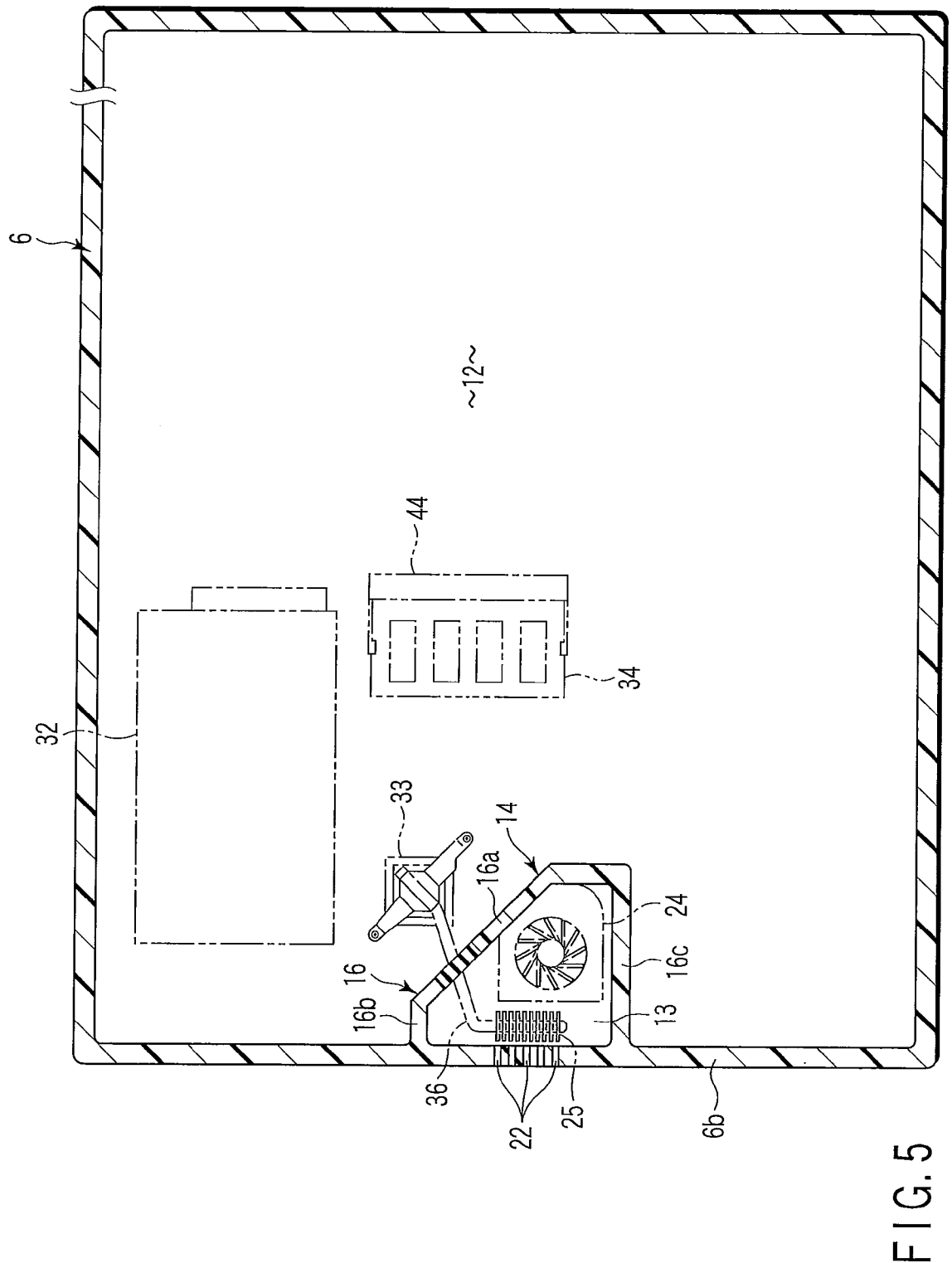
FIG. 5 is an exemplary cross-sectional view showing the portable computer of the first embodiment.

As shown in FIGS. 2 and 5, the housing 6 is provided with a partition wall 14, which partitions an interior space thereof into a first chamber 12 and a second chamber 13. The partition wall 14 has a top wall 15 and a sidewall 16. As shown in FIG. 2, the top wall 15 is positioned between the upper wall 6a and the lower wall 6c of the housing 6, and extends parallel to the upper wall 6a. One end of the top wall 15 is continuous to the sidewall 6b of the housing. The other end of the top wall 15 extends to the inside of the housing 6. The sidewall 16 extends from the other end of the top wall 15 toward the lower wall 6c of the housing 6, and is continuous to the lower wall 6c located in the cover mounting portion 11.

As shown in FIG. 5, the sidewall 16 has a first wall 16a, a second wall 16b and a third wall 16c. The first wall 16a faces the sidewall 6b of the housing, while being oblique to the latter. The second and third walls 16b and 16c extend from both ends of the first wall 16a toward the sidewall 6b of the housing, and are continuous to the sidewall 6b. The partition wall 14 is integral with the housing 6, for example.

With this structure, the first chamber 12 and the second chamber 13 of the housing 6 are liquid-tightly isolated from each other. The first chamber 12 is a closed space isolated from the outside of the housing 6. The first chamber 12 occupies the most part of the interior space of the housing 6. The second chamber 13 occupies a part of the right lower end of the interior part of the housing.

As shown in FIGS. 2 and 4, the housing 6 has a first opening 18 communicating with the second chamber 13. The first opening 18 is formed by substantially entirely cutting out an areal portion of the lower wall 6c of the housing corresponding to the second chamber 13. The second chamber 13 is opened to the outside of the housing 6 through the first opening 18. It is not essential to form the first opening 18 over the entire area corresponding to the second chamber 13. It suffices that the first opening 18 is formed in at least a part of the area corresponding to the second chamber 13, and the second chamber 13 communicates with the outside of the housing 6.

In other words, it can be said that the portable computer 1 is provided with a case 19 having the outer walls 6a, 6b and 6c and a closed interior space. The lower wall 6c of the case 19 includes a hollow part 20 being hollow toward the inside of the case 19. That is, a part of the housing 6 including the first chamber 12 forms the case 19. The second chamber 13 one side of which is opened through the first opening 18 forms the hollow part 20.

As shown in FIGS. 4 and 5, the housing 6 further includes exhaust holes 22. The exhaust holes 22 are opened in a part of the sidewall 6b of the housing which defines the second chamber 13. The exhaust holes 22 communicate with the second chamber 13. Thus, the hollow part 20 communicates with the outside of the portable computer 1 through the exhaust holes 22.

Figure 6:
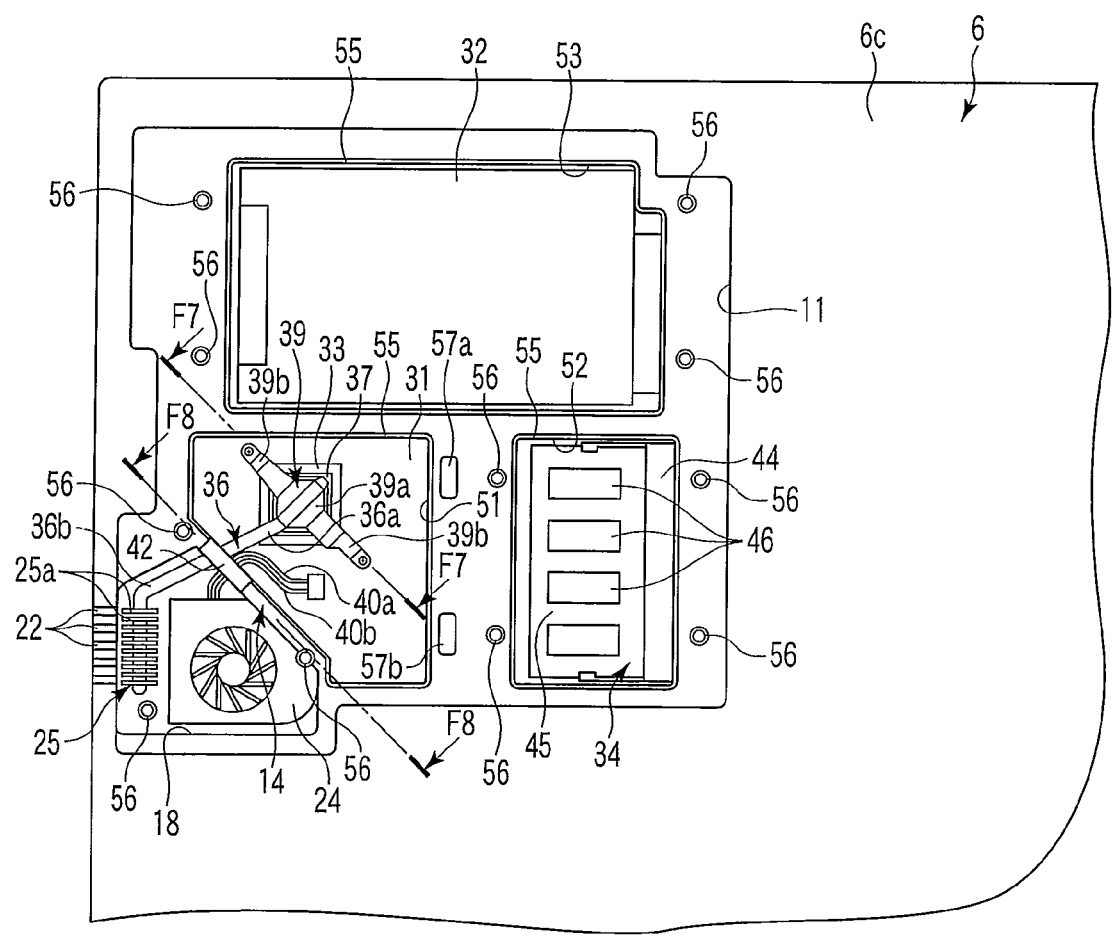
FIG. 6 is an exemplary plan view showing the interior part of the portable computer of the first embodiment.

As shown in FIGS. 2, 4 and 6, the second chamber 13 is provided with a cooling fan 24 and a first heat radiation member 25. In other words, the cooling fan 24 and the first heat radiation member 25 are housed in the hollow part 20 of the case 19. The cooling fan 24 has an intake port 24a and an exhaust port 24b. The intake port 24a is formed in the lower surface of the cooling fan 24, while facing the first opening 18 of the housing 6. The exhaust port 24b faces the first heat radiation member 25.

The cooling fan 24 draws air (referred to as outside air) from the outside of the housing 6 into the second chamber 13 of the housing 6 through the first opening 18, and feeds the drawn air into the cooling fan 24 through the intake port 24a. The cooling fan 24 blows the drawn air against the first heat radiation member 25 through the exhaust port 24b.

The first heat radiation member 25 extends along the exhaust holes 22 of the sidewall 6b. One example of the first heat radiation member 25 is a heat radiation fin. The first heat radiation member 25 contains a plurality of plate-shaped fin elements 25a. The plate surfaces of those fin elements 25a are arrayed in the air blowing direction of the cooling fan 24.

As shown in FIG. 4, a circuit board 31 and a hard disc drive (HDD) 32 are located in the first chamber 12 of the housing 6. A CPU 33 and a memory module 34 are mounted on the circuit board 31. The CPU 33, the memory module 34 and the HDD 32 are arrayed, for example, horizontally.

The CPU 33 is one example of a first heat generating part. As shown in FIG. 7, the CPU 33 includes a base substrate 33a and an IC chip 33b. The base substrate 33a is mounted on the circuit board 31. The IC chip 33b is mounted on the central part of the base substrate 33a.

As shown in FIG. 4, the portable computer 1 includes a heat pipe 36. The heat pipe 36 is one example of a heat transfer member. The heat pipe 36 has a pipe-like container both ends of which are closed. One form of the container is constructed such that a wick is formed on the inner wall of the container, and a coolant fluid is sealed into the container. When one end of the heat pipe 36 is exposed to high temperature, part of the coolant fluid evaporates to move to the other end. The coolant fluid, which has moved to the other end and is now in a vaporized state, radiates heat and condenses at the other end. The coolant fluid having condensed returns to the end having been exposed to high temperature by capillary action.

The heat pipe 36 has a first terminal 36a and a second terminal 36b. The first terminal 36a of the heat pipe 36 is thermally connected to the CPU 33. More specifically, as shown in FIG. 7, the IC chip 33b of the CPU 33 is connected to a heat receiving plate 37. The heat receiving plate 37 is made of a material having high thermal conductivity, such as aluminum alloy or copper alloy. The heat receiving plate 37 is rectangular in shape, and its size is larger than the external dimension of the IC chip 33b.

A heat transfer member 38 is interlayered between the heat pipe 36 and the heat receiving plate 37. The heat transfer member 38 is a lamination of a plurality of heat transfer sheets made of, for example, a silicone material. The heat transfer member 38 is not limited to the heat transfer sheets, but may be silicone grease, for example.

The heat pipe 36 is fixed to the circuit board 31 by means of a fixing member 39. The fixing member 39 includes a cover part 39a and legs 39b. The cover part 39a is brought into contact with the heat pipe 36. The legs 39b extend from both ends of the cover part 39a toward the circuit board 31, and are screwed into the circuit board 31. The fixing member 39 presses the heat pipe 36 against the CPU 33.

As shown in FIGS. 6 and 8, the heat pipe 36 passes through the partition wall 14. A pair of cables 40a and 40b, which extend from the cooling fan 24 toward the circuit board 31, likewise pass through the partition wall 14.

As shown in FIG. 9, the first wall 16a of the partition wall 14 has a rectangular cutout part 16d. The cutout part 16d is formed at an areal region of the partition wall 14 through which the heat pipe 36 and the cables 40a and 40b pass, that is, at the region of a path of the heat pipe 36 and the cables 40a and 40b. The cutout part 16d is cut out to be larger than the cross-sectional areas of the heat pipe 36 and the cables 40a and 40b.

A first sealing member 42 is fit to the cutout part 16d. The first sealing member 42 serves as a part of the partition wall 14. The first sealing member 42 is formed with rubber, for example. The first sealing member 42 includes a pair of first and second members 42a and 42b, which are separable from each other.

The first member 42a has hollows which are deep enough to receive, for example, the lower half parts of the heat pipe 36 and the cables 40a and 40b. The second member 42b has hollows which are deep enough to receive the upper half parts of the heat pipe 36 and the cables 40a and 40b. The heat pipe 36 and the cables 40a and 40b are sandwiched between the first and second members 42a and 42b, whereby the vicinal portions of the heat pipe 36 and the cables 40a and 40b are liquid-tight. The cutout part 16d of the partition wall 14 and the first sealing member 42 are also liquid-tight. Thus, the first sealing member 42 liquid-tightly isolates the first chamber 12 from the second chamber 13 of the housing.

As shown in FIG. 6, the second terminal 36b of the heat pipe 36 extends into the second chamber 13 of the housing 6, and is attached to the first heat radiation member 25. That is, the second terminal 36b of the heat pipe 36 is thermally connected to the first heat radiation member 25. The heat pipe 36 transfers the heat generated by the CPU 33 to the first heat radiation member 25. The cables 40a and 40b of the cooling fan 24 extend into the first chamber 12 and are electrically connected to the circuit board 31.

As shown in FIG. 4, a memory slot 44 is mounted to the circuit board 31. The memory module 34 is inserted into and removed from the memory slot 44. The memory module 34 is one example of the second heat generating part. The memory module 34 includes a child board 45 and a plurality of memory chips 46, for example, mounted on the child board 45. By inserting the child board 45 into the memory slot 44, the memory chips 46 are electrically connected to the circuit board 31.

The first and the second heat generating parts are not limited to the CPU and the memory module, but may be a north bridge, a graphics board, a PCI module or any other heat generating part.

As shown in FIGS. 4 and 6, the cover mounting portion 11 includes second to fourth openings 51, 52 and 53 formed therein. The second to fourth openings 51, 52 and 53 communicate with the first chamber 12 of the housing 6. As shown in FIG. 6, the second opening 51 is provided facing the CPU 33. The third opening 52 is provided facing the memory module 34. The memory module 34 is inserted into and removed from the memory slot 44 through the third opening 52. The fourth opening 53 is provided facing the HDD 32. The HDD 32 is attached to and detached from the inside of the housing 6 through the fourth opening 53.

Figure 15:
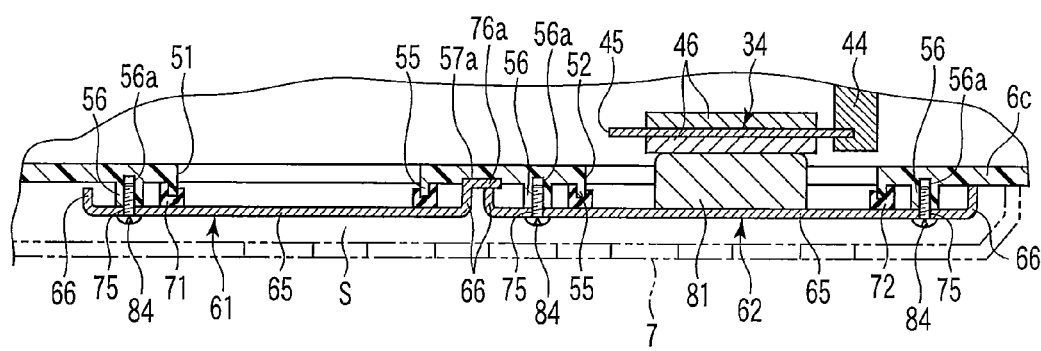
FIG. 15 is an exemplary cross-sectional view showing the portable computer taken along line F15-F15 in FIG. 14.
Figure 16:
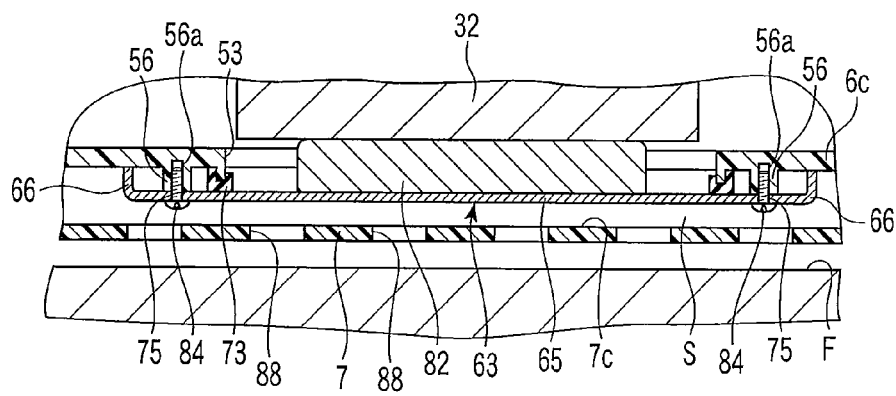
FIG. 16 is an exemplary cross-sectional view showing the portable computer taken along line F16-F16 in FIG. 14.

As shown in FIGS. 15 and 16, a rib 55 is raised toward the outside of the housing 6 from the opening edges of the second to fourth openings 51, 52 and 53. As shown in FIG. 6, the rib 55 surrounds entirely the second to fourth openings 51, 52 and 53.

As shown in FIG. 4, a plurality of bosses 56 are raised from the cover mounting portion 11 toward the outside of the housing 6. The bosses 56 are integral with the lower wall 6c. The bosses 56 are protruded toward the outside of the housing 6 to be much higher than the rib 55. For example, two bosses 56 are located between the second opening 51 and the second chamber 13. Four bosses 56 are located around the third and fourth openings 52 and 53.

A screw hole 56a is formed in each boss 56. A female screw is formed in the surface of the screw hole 56a. As shown in FIGS. 15 and 16, the screw hole 56a reaches the mid-point of the lower wall 6c when viewed in the thickness direction thereof. In other words, the screw hole 56a does not pass through the lower wall 6c.

A pair of recess parts 57a and 57b are formed in an area between the second opening 51 and the third opening 52. Those recess parts 57a and 57b are arrayed along the edge of the second opening 51. The recess parts 57a and 57b are each slightly depressed from the lower wall 6c of the housing 6 toward the inner part of the housing 6.

Figure 10:
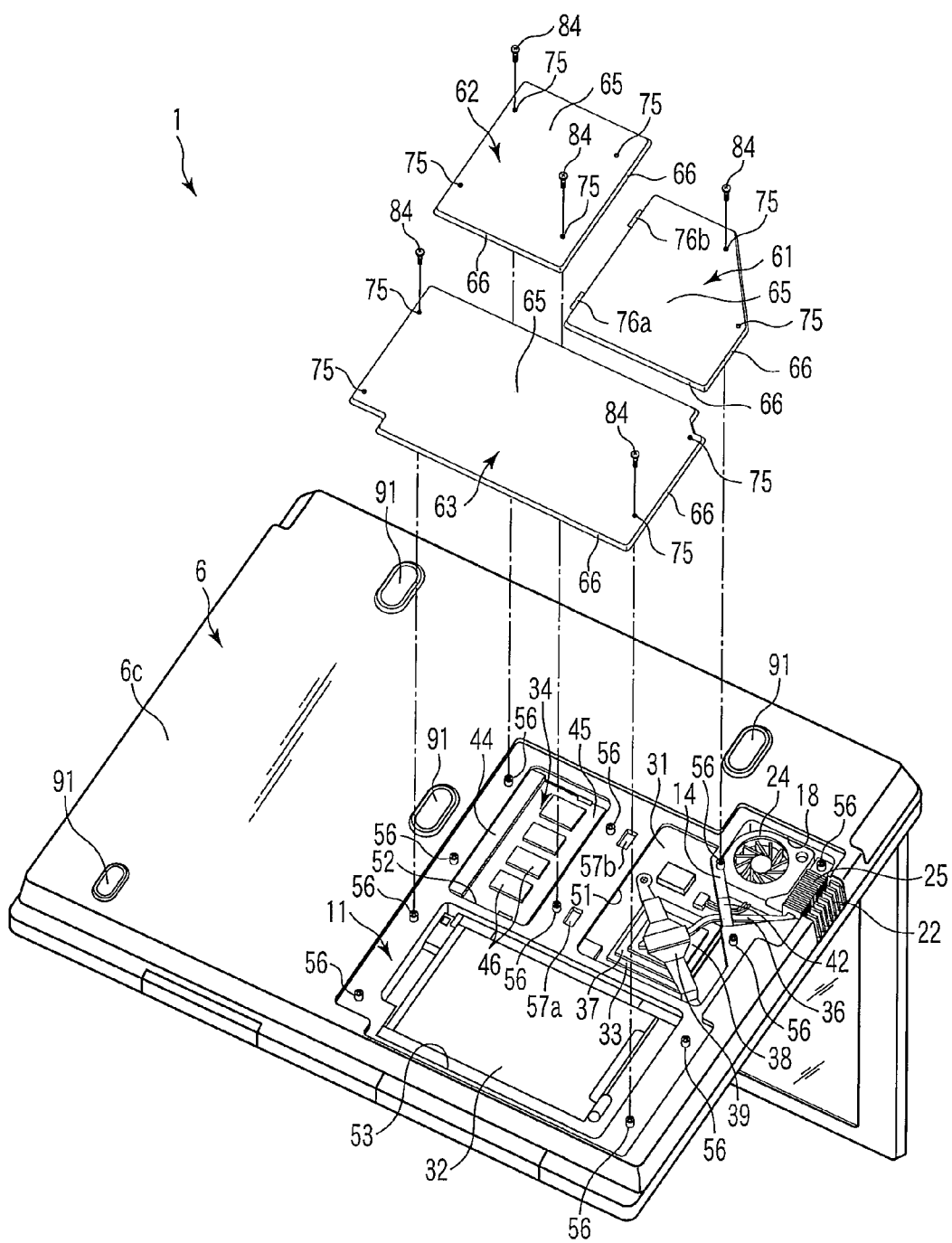
FIG. 10 is an exemplary perspective view showing the portable computer of the first embodiment when covers are mounted.

As shown in FIG. 10, the portable computer 1 includes first to third covers 61, 62 and 63. The first to third covers 61, 62 and 63 are each one form of an outer covering part of the housing. Those covers 61, 62 and 63 are removably mounted to the housing 6. The first cover 61 has a size larger than the second opening 51. The first cover 61 is mounted on the housing 6 to close the second opening 51. As shown in FIG. 15, the first cover 61 includes a flat portion 65 which covers the second opening 51 and the boss 56, and a bent portion 66 which is bent from the peripheral edge of the flat part 65 toward the housing 6.

Figure 11:
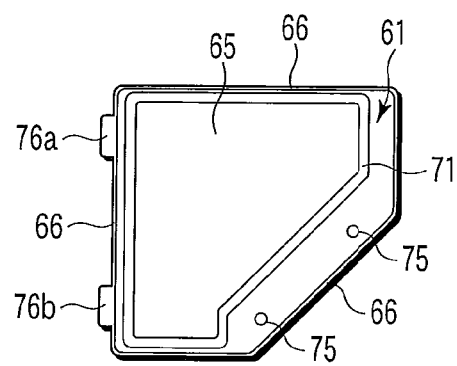
FIG. 11 is an exemplary plan view showing a first cover according to the first embodiment.

As shown in FIGS. 11 and 15, a second sealing member 71 is attached to the rear side of the first cover 61. The second sealing member 71 has a ring-like shape to be equivalent in configuration to the opening edge of the second opening 51. The width of the ring-like second sealing member 71 is larger than that of the rib 55.

Figure 14:
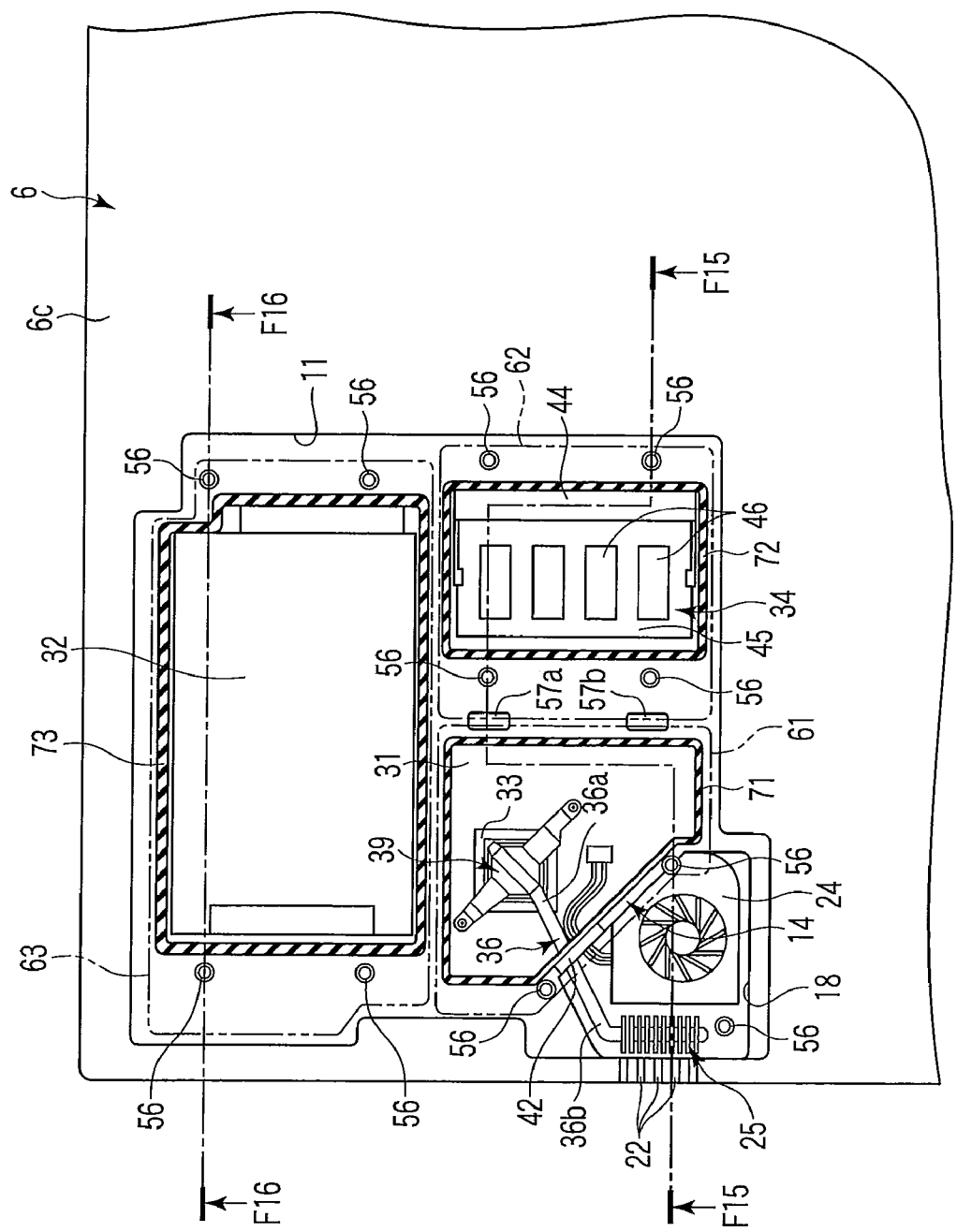
FIG. 14 is an exemplary cross-sectional view showing the portable computer of the first embodiment with the covers mounted thereon.

When the first cover 61 is attached to the housing 6, the second sealing member 71 surrounds the second opening 51 and is interposed between the housing 6 and the first cover 61. To be more specific, the second sealing member 71 comes in contact with the protruded surface, the inner surface and the peripheral surface of the rib 55, and is pressed in three directions so as to wrap the top end part of the rib 55. As shown in FIG. 14, the second sealing member 71 is interposed between the housing 6 and the first cover 61, so that the vicinal portion of the second opening 51 is liquid-tight.

As shown in FIG. 11, screw holes 75 are formed in a region of the first cover 61 closer to the peripheral edge thereof than a region of the first cover 61 contacting the second sealing member 71. The screw holes 75 are through holes. The screw holes 75 correspond in position to the bosses 56 located around the second opening 51.

The first cover 61 further includes a pair of claw parts 76a and 76b. The claw parts 76a and 76b slightly extend downward from the peripheral edge of the first cover 61, and also outward from the housing 6. The claw parts 76a and 76b correspond in position to the recess parts 57a and 57b, respectively. When the first cover 61 is attached to the housing 6, the claw parts 76a and 76b are placed into the recess parts 57a and 57b, respectively.

Figure 12:
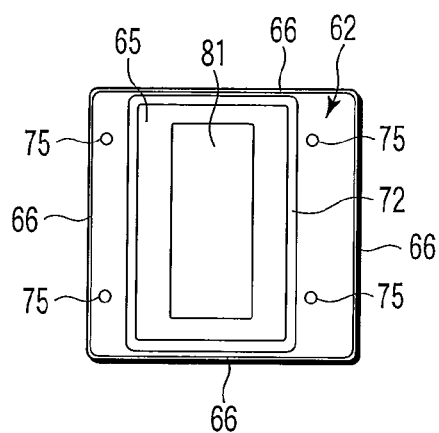
FIG. 12 is an exemplary plan view showing a second cover according to first embodiment.

As shown in FIGS. 12 and 15, the second cover 62 has a size larger than the third opening 52. The second cover 62 is mounted to the housing 6 to close the third opening 52. The second cover 62 is made of a material of good thermal conductivity such as metal, and is one example of a second heat radiation member. The second cover 62 is exposed to the outside of the housing 6.

A third sealing member 72 is mounted to the rear side of the second cover 62. The third sealing member 72 has a ring-like shape to be equivalent in configuration to the opening edge of the third opening 52. The width of the ring-like third sealing member 72 is larger than that of the rib 55. When the second cover 62 is mounted on the housing 6, the third sealing member 72 surrounds the third opening 52 and is interposed between the housing 6 and the second cover 62. With the interposing of the third sealing member 72 between the housing 6 and the second cover 62, the vicinal portion of the third opening 52 is liquid-tight. The third sealing member 72 is pressed in three directions so as to wrap the top end part of the rib 55.

The screw holes 75 as through holes are formed in a region of the second cover 62 closer to the peripheral edge thereof than a region of the second cover 62 contacting the second sealing member 71. The screw holes 75 correspond in position to the screw holes 56a of the bosses 56 located around the third opening 52.

As shown in FIG. 15, a heat transfer member 81 is mounted on the central part of the rear side of the second cover 62. The heat transfer member 81 may be a lamination of heat transfer sheets, for example. As shown in FIG. 15, when the second cover 62 is mounted on the housing 6, the heat transfer member 81 is brought into contact with the memory module 34. That is, the second cover 62 is thermally connected to the memory module 34 through the heat transfer member 81.

Further, as shown in FIG. 15, the second cover 62 is brought into contact with the claw parts 76a and 76b of the first cover 61. As a result, the first cover 61 cannot be removed till the second cover 62 is removed. This structural feature prevents the user from easily opening the first cover 61. Accordingly, the possibility that the CPU 33 is erroneously exposed to the outside is lessened.

Figure 13:
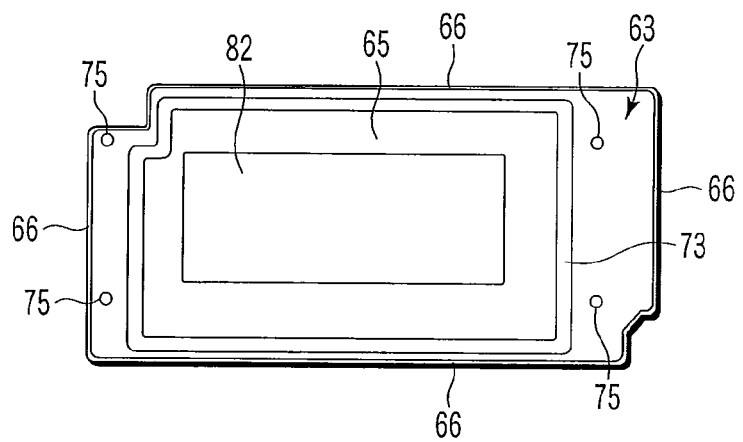
FIG. 13 is an exemplary plan view showing a third cover according to first embodiment.

As shown in FIGS. 13 and 16, the third cover 63 has a size larger than the fourth opening 53. The third cover 63 is mounted on the housing 6 to close the fourth opening 53. The third cover 63 is made of a material of good thermal conductivity such as metal, and is one form of a second heat radiation member.

A fourth sealing member 73 is mounted on the rear side of the third cover 63. The fourth sealing member 73 has a ring-like shape to be equivalent in configuration to the opening edge of the fourth opening 53. The width of the ring-like fourth sealing member 73 is larger than that of the rib 55. When the third cover 63 is mounted on the housing 6, the fourth sealing member 73 surrounds the fourth opening 53 and is interposed between the housing 6 and the third cover 63. With the interposing of the fourth sealing member 73 between the housing 6 and the third cover 63, the vicinal portion of the fourth opening 53 is liquid-tight. The fourth sealing member 73 is pressed in three directions so as to wrap the top end part of the rib 55. For example, sponge rubber may be used for the second to fourth sealing members 71, 72 and 73.

The screw holes 75 as through holes are formed in a region of the third cover 63 closer to the peripheral edge thereof than a region of the third cover 63 contacting the third sealing member 72. The screw holes 75 correspond in position to the screw holes 56a of the bosses 56 located around the fourth opening 53.

A heat transfer member 82 is mounted to the central part of the rear side of the third cover 63. One example of the heat transfer member 82 is a lamination of heat transfer sheets. As shown in FIG. 16, when the third cover 63 is mounted to the housing 6, the heat transfer member 82 is brought into contact with the HDD 32. That is, the third cover 63 is thermally connected to the HDD 32 through the heat transfer member 82.

As shown in FIGS. 15 and 16, screws 84 are respectively inserted into the screw holes 75 formed in the first to third covers 61, 62 and 63. The screws 84 having inserted into the screw holes 75 are screwed into the screw hole 56a of the lower wall 6c of the housing, respectively. As a result, the first to third covers 61, 62 and 63 are fixed to the housing 6. The first to third covers 61, 62 and 63 having been fixed to the housing 6 are exposed to the outside of the housing 6.

Figure 17:
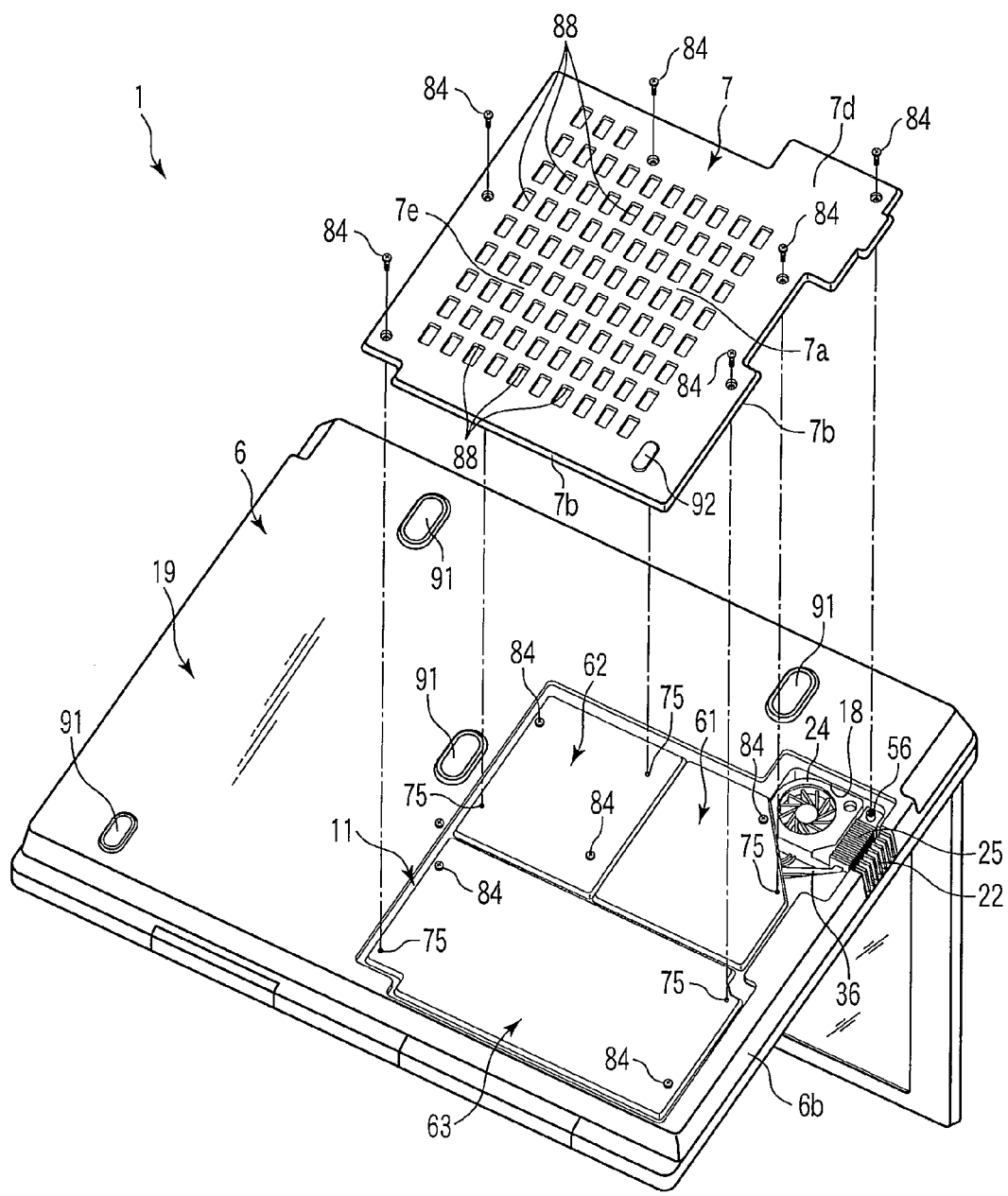
FIG. 17 is an exemplary perspective view showing the portable computer of the first embodiment when the covers are mounted.

As shown in FIG. 17, a size of the cover 7 is about half of the lower wall 6c of the housing. The cover 7 is mounted on the cover mounting portion 11, and entirely covers the first opening 18 communicating with the second chamber 13, and the first to third covers 61, 62 and 63 mounted on the cover mounting portion 11. The cover 7 covers also the first heat radiation member 25 and the cooling fan 24.

As shown in FIG. 2, the cover 7 includes a center portion 7a shaped like a flat plate, and a bent portion 7b bent from the peripheral edge of the center portion 7a toward the housing 6. Since the cover 7 has the bent portion 7b along the peripheral edge of the center portion 7a, a gap S is formed between the center portion 7a of the cover 7 and the housing 6 when the cover 7 is mounted on the housing 6. The first to third covers 61, 62 and 63 are exposed to the gap S between the cover 7 and the housing 6.

The gap S between the cover 7 and the housing 6 communicates with the first opening 18 and the second chamber 13 of the housing 6. The gap S functions as an air passage which allows the space around the first to third covers 61, 62 and 63 to communicate with the intake port 24a of the cooling fan 24, which is housed in the second chamber 13. A distance between the housing 6 and the cover 7, which define the gap S, is, for example, 2.0 to 2.5 mm.

Figure 18:
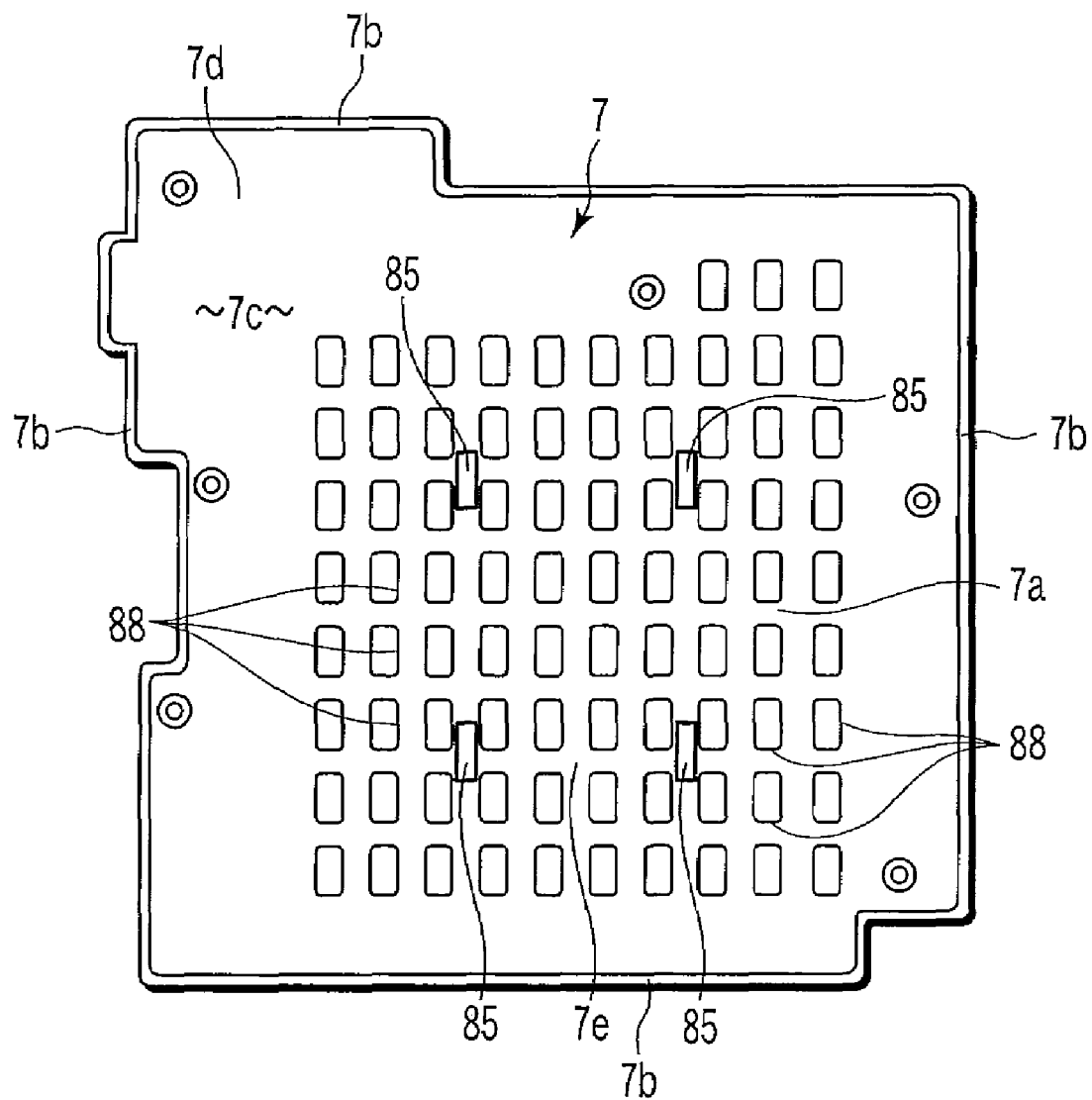
FIG. 18 is an exemplary plan view showing the cover according to the first embodiment.

The cover 7 has a rear side 7c which faces the housing 6. As shown in FIG. 18, a plurality of gap holding members 85 are provided on the rear side 7c of the cover 7. As shown in FIG. 2, each of the gap holding members 85 has substantially the same thickness as the size of the gap S formed between the cover 7 and the housing 6. The gap holding members 85 are interposed between the cover 7 and the housing 6 to thereby maintain the gap S. The gap holding members 85 may be formed with synthetic rubber, for example.

The cover 7 includes a first region 7d arranged in opposition to the first opening 18 and a second region 7e located out of the first region 7d. That is, the first region 7d is arranged opposed to the cooling fan 24. For example, a plurality of intake holes 88 are formed in the second region 7e. The intake holes 88 are formed in substantially the entire area of the second region 7e. The intake holes 88 are arrayed in a lattice, for example. The gap S between the cover 7 and the housing 6 communicates with the outside of the portable computer 1 through the intake holes 88. With this structure, the outside air flows between the cover 7 and the housing 6 through the intake holes 88. The first to third covers 61, 62 and 63 are exposed to the open air.

The cover 7 is mounted on the housing 6 by means of the screws 84. As shown in FIG. 17, the screws 84 for fixing the cover 7 are also used for fixing the first to third covers 61, 62 and 63. Accordingly, the first to third covers 61, 62 and 63 are fixed by the screws 84 for fixing the cover 7.

A plurality of first legs 91 are formed at positions on the lower wall 6c of the housing 6 which is located out of the cover mounting portion 11. The first legs 91 protrude from the lower wall 6c of the housing to the outside of the portable computer 1 compared with the cover 7. Similarly, the cover 7 is provided with a second leg 92. The second leg 92 protrudes from the lower side of the cover 7 to the outside of the portable computer 1.

Now, operation of the portable computer 1 will be described.

When the portable computer 1 is operated, the IC chip 33b of the CPU 33 generates heat. Part of the heat generated by the CPU 33 is transferred to the first terminal 36a of the heat pipe 36 through the heat receiving plate 37 and the heat transfer member 38. The heat pipe 36 transfers heat at the first terminal 36a to the second terminal 36b by use of vaporization heat. The heat having reached the second terminal 36b of the heat pipe 36 propagates to the first heat radiation member 25. The cooling fan 24 blows air against the first heat radiation member 25. The air blown from the cooling fan 24 takes the heat from the first heat radiation member 25 and exhausts it to the outside of the housing 6 through the exhaust holes 22. Thus, the first heat radiation member 25 is forcibly cooled to promote heat radiation from the CPU 33.

Part of the heat generated by the memory module 34 and the HDD 32 is transferred to the second or third cover 62 or 63 through the heat transfer members 81 or 82 attached to the second or third cover 62 or 63. The cooling fan 24, when driven to operate, draws air from the second chamber 13 of the housing 6, and blows the drawn air to the first heat radiation member 25. The air blown out of the cooling fan 24 is exhausted to the outside of the housing 6 through the exhaust holes 22 of the sidewall 6b.

Figure 19:
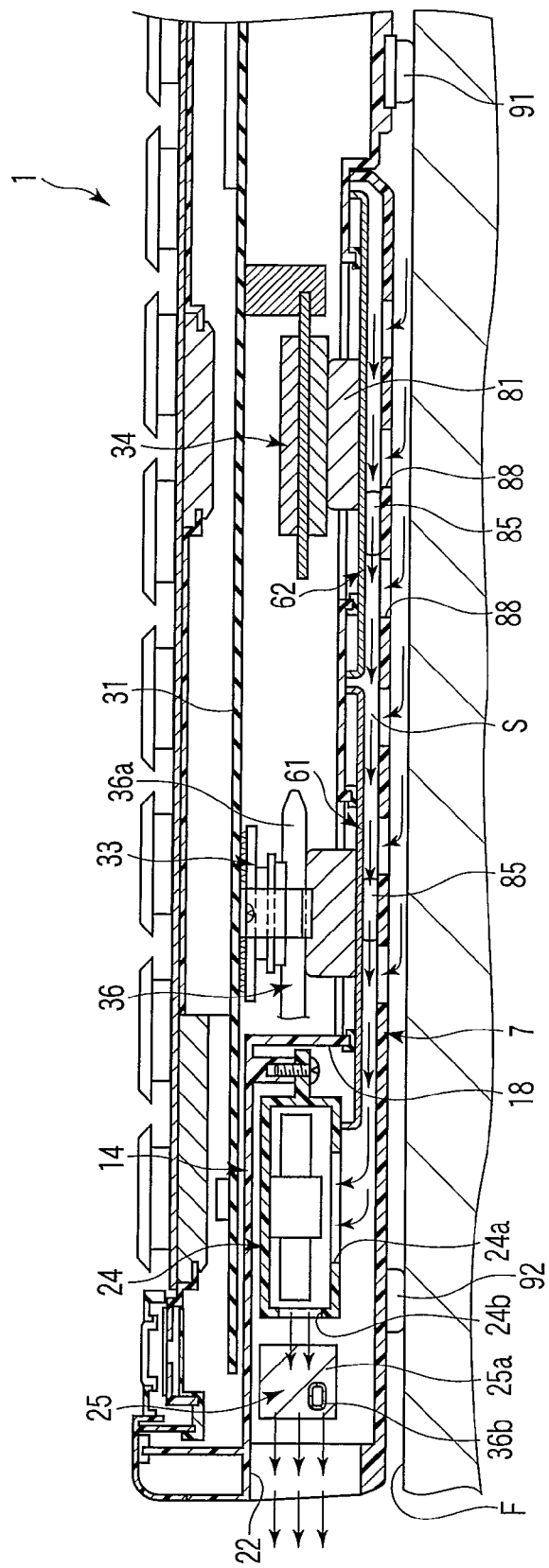
FIG. 19 is an exemplary cross-sectional view showing air flows in the portable computer of the first embodiment.

As shown in FIG. 19, when the cooling fan 24 continues its operation, the cooling fan 24 draws air from the gap S between the cover 7 and the housing 6 through the first opening 18. With the operation of the cooling fan 24, cool outside air flows from the outside of the portable computer 1 into the gap S between the cover 7 and the housing 6, through the intake holes 88. The outside air having flowed into the gap S between the cover 7 and the housing 6 through the intake holes 88 flows toward the first opening 18 in the gap S. At this time, the second cover 62 and the third cover 63 are exposed to the air flowing through the gap S between the cover 7 and the housing 6, and part of the heat of those covers 62 and 63 is absorbed into the flowing air. As a result, the cooling operation of the memory module 34 and the HDD 32 is promoted.

The air absorbing the heat from the second cover 62 and the third cover 63 flows into the second chamber 13 via the first opening 18. The air having flowed into the second chamber 13 is discharged, by the cooling fan 24, to the outside of the portable computer 1 by way of the exhaust holes 22.

With such a construction of the portable computer 1, the first and second heat generating parts are both cooled by the cooling fan, so that the cooling efficiency of the heat generating parts is enhanced. The CPU 33 of which the heating amount is relatively large is efficiently heat radiated, by the heat pipe 36, the first heat radiation member 25, and the cooling fan 24. The memory module 34 and the HDD 32, which are smaller in heating amount than the CPU 33 but their heat radiation is required, are heat radiated since the second cover 62 and the third cover 63 serve as heat sinks. By supplying cool outside air to the space around the second cover 62 and the third cover 63 by the cooling fan 24, which is provided mainly for cooling the CPU 33, cooling of the memory module 34 and the HDD 32 is promoted.

In other words, in the embodiment, a plurality of heat generating parts having different heating amounts are associated with a plurality of heat radiation paths, which are provided depending on the heating amounts of the heat generating parts. The heat radiation of those heat radiation paths is promoted by using one cooling fan 24. This feature contributes to size and cost reduction of the portable computer 1.

The intake holes 88 formed in the cover 7 provide easy supply of the outside air to between the cover 7 and the housing 6. In this sense, provision of those suction holes contributes to enhancement of the cooling efficiency of the memory module 34 and the HDD 32. Particularly, formation of the intake holes 88 at an area in the second region 7e located out of the area just under the cooling fan 24, brings about the following advantage. Even when a liquid enters the gap S between the cover 7 and the housing 6 through the intake holes 88, there is less possibility that the liquid will adhere to the cooling fan 24. This feature contributes to enhancement of reliability of the portable computer 1.

Temperature of the second cover 62 and the third cover 63 will be high as a possibility. If the cover 7 is mounted so as to cover the second cover 62 and the third cover 63, the possibility of the user touching the second cover 62 and the third cover 63 is lessened.

If the function of the second heat radiation member is given to the second cover 62 and the third cover 63, which cover the openings 52 and 53, by using metal for those covers, there is no need of using an additional heat radiation member for cooling the memory module 34 and the HDD 32.

With provision of the first legs 91 on the lower wall 6c, a gap is formed between the cover 7 and a installation surface F such as a desk top even when the lower wall 6c is placed on the installation surface F. Outside air is drawn through the gap formed between surface F and the cover 7. In this respect, formation of the gap contributes to enhancement of the cooling efficiency of the portable computer 1. Provision of the second leg 92 to the cover 7 makes formation of the gap between the cover 7 and the installation surface F more reliable.

With provision of the gap holding members 85 interposed between the housing 6 and the cover 7, the gap S between the housing 6 and the cover 7 is reliably held. This contributes to enhancement of the cooling efficiency of the portable computer 1.

With provision of the first sealing member 42 surrounding the heat pipe 36 on the partition wall 14, liquid-tight sealing is secured between the first chamber 12 and the second chamber 13. With this, the drip-proof of the portable computer 1 is improved.

Use of the second sealing members 71, 72 and 73 which surround the second to fourth openings 51, 52 and 53, and are interposed between the covers 61, 62 and 63 and the housing 6, makes the vicinity of the second to fourth openings 51, 52 and 53 liquid-tight. As a consequence, the drip-proof of the portable computer 1 is improved. When the sealing members 71, 72 and 73 are compressed so as to wrap the rib 55, the vicinal portions of the second to fourth openings 51, 52 and 53 are made more liquid-tight. This feature contributes to improvement of the drip-proof performance of the portable computer 1.

Where the sealing member is placed around the opening of the case, it would be possible to compress the sealing member by fitting the cover covering the opening to the case. In the case of this approach, the work of attaching and detaching the cover will be complicated. In this connection, it is noted that according to one aspect of the invention, there is provided a drip-proof structure with improved assembling properties.

According to one aspect of the invention, there is provided a drip-proof structure comprising: a housing including an opening; a cover which covers the opening; a screw which fixes the cover to the housing; and a sealing member interposed between the housing and the cover, while surrounding the opening.

The cover includes a through hole into which the screw is inserted, and which is located in a region of the cover closer to the peripheral edge of the cover than a region of the cover contacting the sealing member. The housing includes a screw hole reaching the mid-point of a wall of the housing when viewed in the thickness direction thereof, the screw hole corresponding in position to the through hole of the cover, and the screw hole receiving the screw. This drip-proof structure provides improved assembling properties. A portable computer is one example of the drip-proof structure.

More specifically, the covers 61 to 63 are fixed to the housing 6 by means of screws. Therefore, the work of attaching and detaching the covers 61 to 63 is improved. The screw holes 75 are formed in the covers 61 to 63 for the purpose of securing the covers 61 to 63 with screws. The screw holes 75 are located in a region of the covers 61 to 63 closer to the peripheral edges thereof than a region thereof contacting the sealing members 71 to 73. With this structural feature, for the possibility of a liquid, which has entered between the covers 61 to 63 and the housing 6 through the screw holes 75, entering the openings 51 to 53 is lessened. If the screw hole 56a does not pass through the outer wall 6c, there is no danger of liquid entering the inside of the housing 6 through the screw hole 56a. Consequently, the resultant portable computer 1 is improved in drip-proof performance and assembling properties.

A portable computer 101 as an electronic device according to a second embodiment of the invention will be described with reference to FIGS. 20 and 21. Like reference numerals are used for designating like or equivalent portions in the portable computer 1 of the first embodiment, and explanations thereof are omitted.

Figure 20:
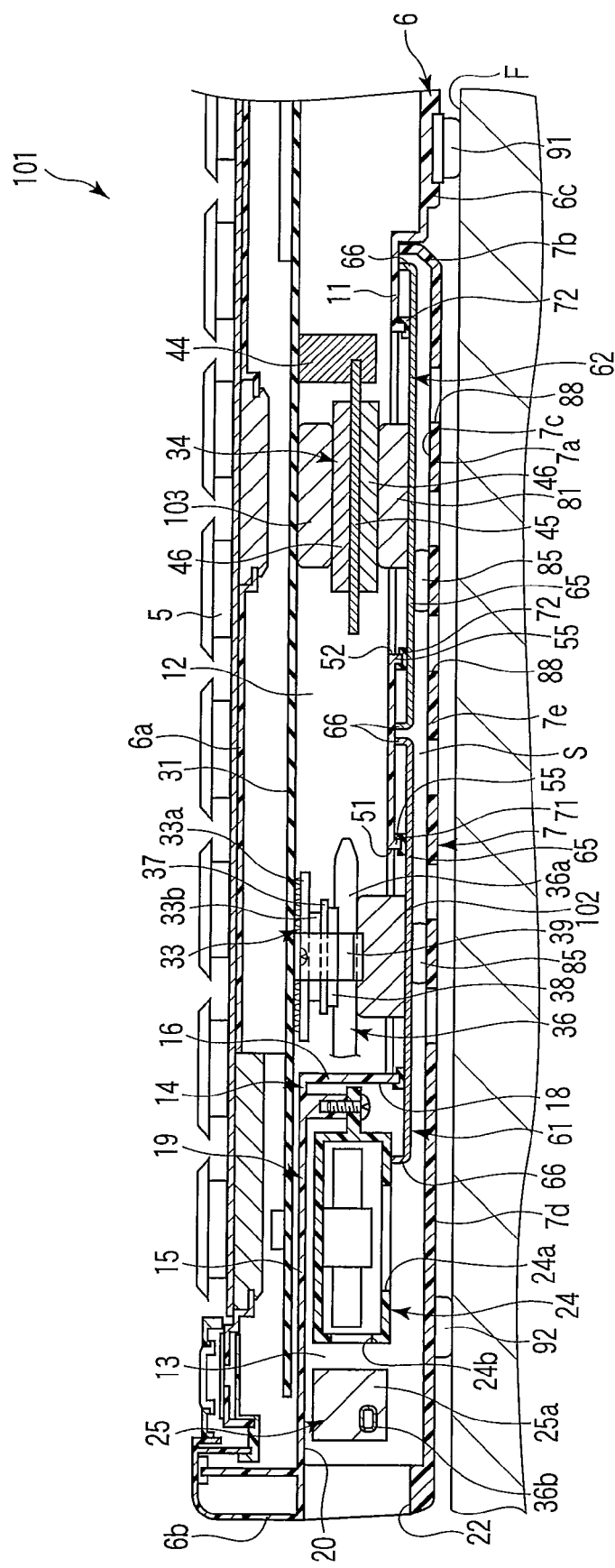
FIG. 20 is an exemplary cross-sectional view showing a portable computer according to a second embodiment of the invention.

As shown in FIG. 20, the portable computer 101 includes a CPU 33 installed in a housing 6. The CPU 33 is one example of a first heat generating part. A heat transfer member 102 is mounted on the rear side of a first cover 61. The heat transfer member 102 is in contact with a fixing member 39. The first cover 61 is made of a material of good thermal conductivity such as metal, and functions as one form of a second heat radiating member. The heat transfer member 102 may be a lamination of heat transfer sheets, for example. The first cover 61 is thermally connected to the CPU 33 through the heat transfer member 102.

Another heat transfer member 103 is interposed between a memory module 34 and a circuit board 31. An example of the other heat transfer member is a lamination of heat transfer sheets. The memory module 34 is thermally connected to the circuit board 31 through the heat transfer member 103.

As shown in FIG. 21, the first to third covers 61, 62 and 63 are provided with heat radiation fins 104, respectively. The heat radiation fins 104 may be pin-like members provided on the first cover 61, or plate-like members provided on the second and third covers 62 and 63. The heat radiation fins 104 are configured so as to be directed along the air flow direction between the housing 6 and the cover 7.

In the portable computer 101 thus constructed, the cooling fan 24 cools both the first and second heat generating parts, whereby the cooling efficiency of the heat generating parts is improved. As in the portable computer 1 of the first embodiment, a plurality of heat generating parts having different heating amounts are associated with a plurality of heat radiation paths, which are provided depending on the heating amounts of the heat generating parts. The heat radiation of those heat radiation paths is promoted by using one cooling fan 24.

The portable computer 101 of the embodiment provides further improvement of the cooling efficiency. For example, when the heat transfer member 102 is interposed between the first cover 61 and the CPU 33, the first cover 61 is thermally connected to the CPU 33. The first cover 61 exposed to between the cover 7 and the housing 6 functions as a heat sink, thereby to promote the cooling of the CPU 33.

For example, where the heat transfer member 103 is interposed between the memory module 34 and the circuit board 31, the memory module 34 is thermally connected to the circuit board 31. Part of the heat generated by the memory module 34 propagates to the circuit board 31, and it is exhausted to outside through the atmosphere in the housing 6 and the outer walls of the housing 6. More specifically, if the heat transfer members 102 and 103 are respectively provided between the first cover 61 and the CPU 33 and between the memory module 34 and the circuit board 31, more increased number of heat radiation passes are formed, leading to enhancement of the cooling efficiency of the portable computer 1.

Additionally, when the first to third covers 61, 62 and 63 are provided with the heat radiation fins 104, the cooling efficiency of those covers is further enhanced.

While the portable computers 1 and 101 according to the first and second embodiments have been described, it is clear that the present invention is not limited to these computers. The heat transfer members 38, 81, 82, 102 and 103 may be formed with silicone grease or any material having good thermal conductivity, in place of the heat transfer sheet. It is not essential that the first chamber 12 and the second chamber 13 are liquid-tightly separated from each other. The second to fourth sealing members 71, 72 and 73 are also not essential from the standpoint of the cooling efficiency enhancement. Further, it is not essential that the intake holes 88 are formed in the cover 7. The intake holes may take any shape if they are capable of drawing air, which is to be fed to between the cover 7 and the housing 6. Locations of the intake holes are not limited to the described ones if such a condition is satisfied. It is clear that the invention may be applied to various types of electronic devices, in addition to the portable computer 1.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An electronic device comprising:
   a housing;
   a heat generating component in the housing;
   a heat radiation member exposed to the outside of the housing and thermally connected to the heat generating component; and
   an outer member facing the heat radiation member and providing a gap between the outer member and the housing, the gap allowing air to flow therethrough, the outer member comprising a hole through which the gap communicates with the outside of the electronic device.

2. The electronic device of claim 1, further comprising:
   a cooling fan configured to cause air to flow into the gap.

3. The electronic device of claim 2, further comprising:
   another heat generating component in the housing; and
   another heat radiation member in the housing thermally connected to said another heat generating component, wherein
   the cooling fan faces said another heat radiation member.

4. The electronic device of claim 2, wherein
   the hole is located outside a region facing the cooling fan of the outer member.

5. An electronic device comprising:
a housing comprises an opening part;
a heat generating component in the housing;
a heat radiation member exposed to the outside of the housing and thermally connected to the heat generating component, the heat radiation member being detachably attached to the housing to cover the opening part; and
an outer member facing the heat radiation member and providing a gap between the outer member and the housing, the gap allowing air to follow therethrough, the outer member being detachably attached to the housing.

6. The electronic device of claim 5, further comprising:
a sealing member which surrounds the opening part of the housing and is interposed between the housing and the heat radiation member.

7. The electronic device of claim 6, wherein
a rib is provided at an edge of the opening part of the housing, the rib being raised toward the outside of the housing, and
the sealing member is compressed between the housing and the heat radiation member in order to wrap a top end of the rib.

8. The electronic device of claim 6, further comprising:
a screw which fixes the heat radiation member to the housing, wherein
the heat radiation member comprises a through hole into which the screw is inserted, the through hole being in a region closer to an edge of the radiation member than a region contacting the sealing member, and
the housing comprises a wall, and a screw hole reaching the mid-point of the wall and receiving the screw.

9. The electronic device of claim 1, wherein
the outer member is mounted on a lower surface of the housing, and
the housing is provided with a leg which protrudes toward the outside of the electronic apparatus compared with the outer member.

10. The electronic device of claim 1, further comprising:
a holding member interposed between the housing and the outer member, the holding member holding the gap between the housing and the outer member.

11. An electronic device comprising:
a housing;
a first heat generating component contained in the housing;
a second heat generating component contained in the housing;
a first heat radiation member in the housing thermally connected to the first heat generating component;
a second heat radiation member exposed to the outside of the housing and thermally connected to the second heat generating component;
a cooling fan further inward within the housing than the first radiation member and facing the first heat radiation member; and
an outer member facing the second heat radiation member and providing a gap between the outer member and the housing, wherein the cooling fan is configured to be driven to cause air to flow through the gap.

12. The electronic device of claim 11, wherein
the outer member comprises hole through which the gap communicates with the outside of the electronic device.

13. The electronic device of claim 12, wherein
the hole is located outside a region opposed to the cooling fan of the outer member.

14. The electronic device of claim 11, wherein
the outer member is detachably attached to the housing;
the housing comprises an opening part; and
the second heat radiation member is detachably attached to the housing to cover the opening part.

15. The electronic device of claim 14, further comprising:
a sealing member which surrounds the opening part of the housing and is interposed between the housing and the second heat radiation member.

16. The electronic device of claim 11, wherein
the housing comprises an opening part which exposes the cooling fan to the gap.

17. The electronic device of claim 11, wherein
the housing comprises a hole, and the first heat radiation member is located between the hole of the housing and the cooling fan.

* * * * *